T. E. JENKINS.
SAFETY DEVICE FOR SAWS.
APPLICATION FILED OCT. 26, 1915.
1,183,383.
Patented May 16, 1916.
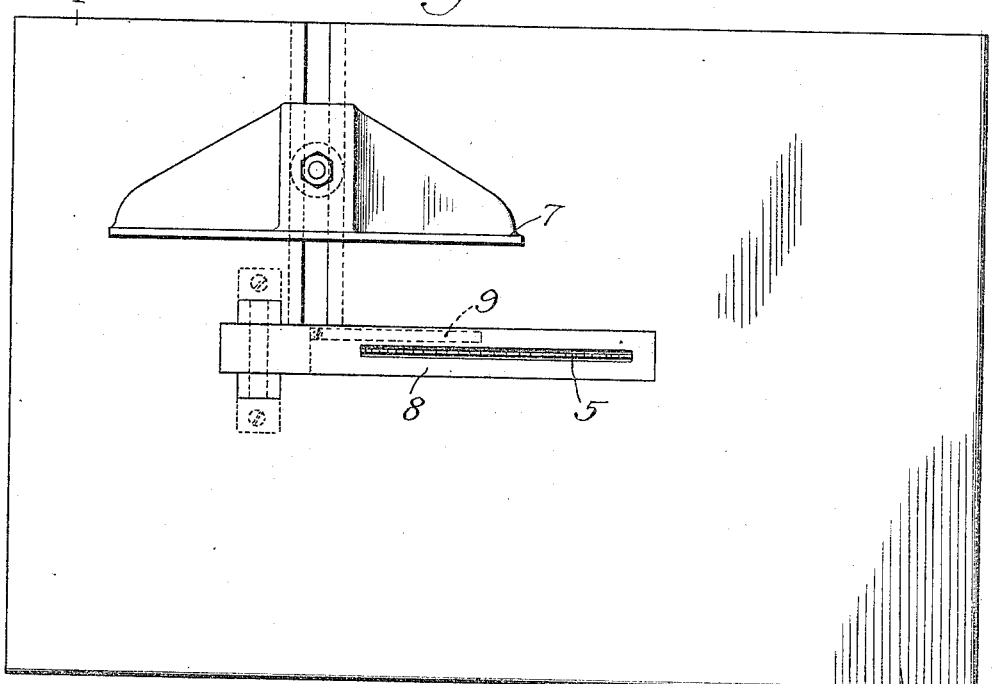
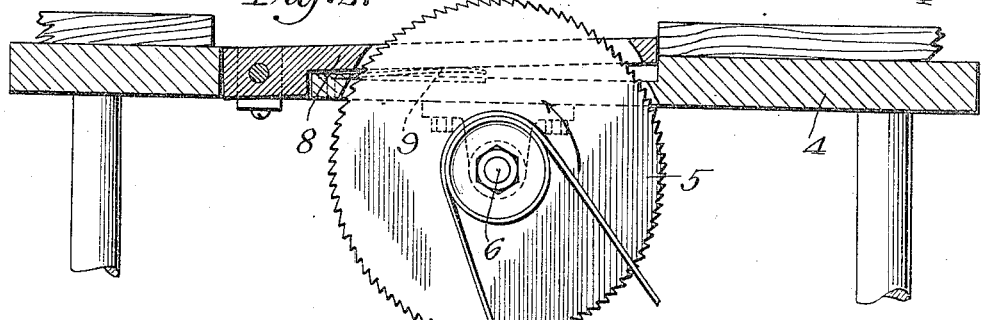
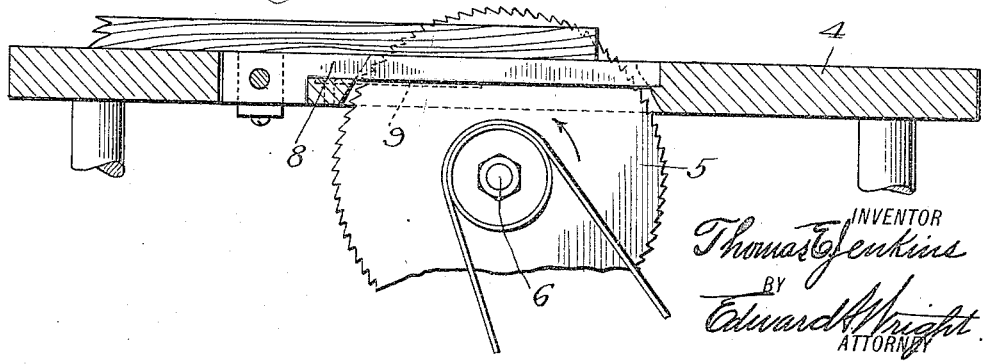

UNITED STATES PATENT OFFICE.

THOMAS E. JENKINS, OF NEW YORK, N. Y.

SAFETY DEVICE FOR SAWS.

1,183,383.　　　　Specification of Letters Patent.　　Patented May 16, 1916.

Application filed October 26, 1915.  Serial No. 57,915.

*To all whom it may concern:*

Be it known that I, THOMAS E. JENKINS, a citizen of the United States, and a resident of the county of Bronx, in the city and State of New York, have invented a certain new and useful Improvement in Safety Devices for Saws, of which improvement the following is a specification.

This invention relates to safety device for saws, and more particularly to vertical circular saws as used on the ordinary saw table of a carpenter's shop, the principal object being to provide an improved form of guard for preventing the piece of lumber or the strip sawed therefrom, after passing the saw, from accidentally coming in contact with the edge or side of the saw, upon the return movement of the piece or strip for further operations. With this object in view, I provide a yielding spring actuated guard preferably extending along one or both sides of the saw, and adapted to be pressed down within a recess in the saw table by the work or piece of lumber when the same is being sawed, and to automatically spring up at the front edge and side of the circular saw when the end of the piece has passed the edge of the saw.

In the accompanying drawing: Figure 1 is a plan of a saw table having my improved safety device applied thereto; Fig. 2, a vertical longitudinal section taken along the plane of the saw; and, Fig. 3, a similar section taken along the edge of the guard.

According to the construction shown in the drawing, 4 indicates the saw table as ordinarily used in a carpenter's or woodworking shop, and having the circular saw, 5, carried on a shaft, 6, mounted in suitable bearings beneath the table and extending up through a slot therein. An adjustable gage, 7, is also usually employed and may be set at any desired distance from the saw to determine the width of the strip that is to be sawed off from the piece of lumber that is to be operated upon. With this usual construction the work is fed or advanced upon the saw by hand, the strip being cut as the piece passes the saw, and when the cut is finished, the piece is brought back by the hand of the workman along the side of the saw for a repetition of the operation. During this operation the piece of lumber or the strip that has been sawed off sometimes accidentally comes into contact with the edge or side of the revolving saw, with the result that serious injuries have been inflicted upon the workman.

In order to prevent the possibility of the work coming into accidental contact with the saw upon a return movement, or after the completion of a forward feeding movement, I provide a yielding guard, 8, mounted in a recess in the top of the table, and preferably extending along one or both sides of the saw and slightly beyond the edge thereof, with means such as a spring, 9, for automatically throwing up the guard so as to project above the top surface of the table after the work has been fed past the saw in its forward movement. The guard is preferably in the form of a strip having a slot formed therein for the saw, and pivotally connected at one end to the table top, as shown in the drawing, although it may be made in a variety of other forms. With this preferred construction, the guard is substantially flush with the top of the table at its pivoted end and is normally raised by the spring at its opposite end beyond the edge of the saw and at the sides of the same, to afford a complete protection to the saw against being accidentally engaged by any piece of lumber or other article resting on the top of the table. When the piece is fed to the saw, as shown in Fig. 3, the guard strip readily yields and is depressed by the weight of the piece into its recess so that its upper surface is flush with the top surface of the table as the work is passing the saw during the cutting operation. As the end of the piece of work passes the farther edge of the saw, the guard strip is thrown up by the spring, as shown in Fig. 2, and protects the saw both at its edge and along the sides.

Having now described my invention, what I claim as new and desire to secure by Letters Patent is:

1. In a safety device for circular saws, the combination of a table, a saw mounted transversely to the plane of the table and projecting above its surface, a yielding guard located in a recess in the top surface of the table at the side of the saw and extending from the rear edge to the front edge of the same, and means for automatically projecting the guard above the table after the passage of the work.

2. In a safety device for circular saws, the combination of a saw table having a slot for the saw, and a recess along the side of the slot, a yielding guard mounted in said recess, and a spring for projecting said guard above the table after the passage of the work.

3. In a safety device for circular saws, the combination of a saw table having a vertical slot for the saw and a recess along both sides thereof, a yielding strip mounted in said recess and having a slot for the saw, and a spring for projecting said strip above the table after the passage of the work.

In testimony whereof I have hereunto set my hand.

THOMAS E. JENKINS.

Copies of this patent may be obtained for five cents each, by addressing the "Commissioner of Patents, Washington, D. C."